(12) United States Patent
Chai

(10) Patent No.: US 9,429,797 B2
(45) Date of Patent: Aug. 30, 2016

(54) LIQUID CRYSTAL PANEL COMPRISING FIRST AND SECOND LIQUID CRYSTAL CAPACITORS AND LIQUID CRYSTAL DISPLAY HAVING THE SAME

(71) Applicant: Shenzhen China Star Optoelectronics Technology Co. Ltd., Shenzhen, Guangdong (CN)

(72) Inventor: Li Chai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 48 days.

(21) Appl. No.: 14/368,495

(22) PCT Filed: Jun. 9, 2014

(86) PCT No.: PCT/CN2014/079498
§ 371 (c)(1),
(2) Date: Jun. 24, 2014

(87) PCT Pub. No.: WO2015/184649
PCT Pub. Date: Dec. 10, 2015

(65) Prior Publication Data
US 2015/0355509 A1 Dec. 10, 2015

(30) Foreign Application Priority Data

Jun. 4, 2014 (CN) .......................... 2014 1 0244565

(51) Int. Cl.
*G02F 1/1343* (2006.01)
*G02F 1/1333* (2006.01)
*G02F 1/1335* (2006.01)
*G02F 1/1368* (2006.01)

(52) U.S. Cl.
CPC ....... *G02F 1/134309* (2013.01); *G02F 1/1368* (2013.01); *G02F 1/13439* (2013.01); *G02F 1/133345* (2013.01); *G02F 1/133514* (2013.01); *G02F 1/133602* (2013.01); *G02F 2201/40* (2013.01)

(58) Field of Classification Search
CPC .......... G02F 1/1368; G02F 1/136227; G02F 2001/133521; G02F 2201/40; G02F 1/133345; G02F 1/133602; H01L 27/1214
See application file for complete search history.

(56) References Cited

U.S. PATENT DOCUMENTS

2001/0000437 A1* 4/2001 Tanaka .............. G02F 1/133512
349/110
2008/0055530 A1* 3/2008 Fan Jiang ......... G02F 1/133555
349/144

(Continued)

FOREIGN PATENT DOCUMENTS

CN 1841143 A 10/2006

*Primary Examiner* — Paul Lee
(74) *Attorney, Agent, or Firm* — Andrew C. Cheng

(57) ABSTRACT

A liquid crystal panel includes multiple pixel units, each pixel unit including a first pixel region and a second pixel region. Besides, the liquid crystal panel comprises a thin-film-transistor (TFT) substrate, a color filter substrate disposed oppositely to the TFT substrate; a liquid crystal layer disposed between the TFT substrate and the color filter substrate; multiple pixel electrodes disposed on the TFT substrate; a common electrode disposed on the color filter substrate; a first insulation layer disposed on the color filter substrate, located in the first pixel region and located between the color filter substrate and the common electrode; and a second insulation layer disposed on the color filter substrate, located in the second pixel region and located above the color filter substrate and the common electrode. The present invention also discloses a liquid crystal display having the above liquid crystal panel.

20 Claims, 2 Drawing Sheets

(56) References Cited

U.S. PATENT DOCUMENTS

2009/0103020 A1* 4/2009 Li .................. G02F 1/133514
349/106

2011/0019114 A1* 1/2011 Tsubata ............... G02F 1/13624
349/38

* cited by examiner

LIQUID CRYSTAL PANEL COMPRISING FIRST AND SECOND LIQUID CRYSTAL CAPACITORS AND LIQUID CRYSTAL DISPLAY HAVING THE SAME

BACKGROUND OF THE INVENTION

1. Field of the Invention

The present invention relates to a liquid crystal display technology, and more particularly to a liquid crystal panel and a liquid crystal display having the liquid crystal panel.

2. Description of Related Art

A liquid crystal display (LCD) is a thin and flat display device. The LCD consists of a number of color or monochrome pixels placed in front of a light source or a reflection plate. The power consumption of the LCD is very low. Besides, the LCD has features of high-quality, small size and light weight. Therefore, everyone loves the LCD, and the LCD becomes a mainstream display. The LCD has been widely used in various electronic products, such as computer equipment having display monitors, mobile phones, or digital picture frames. The wide-viewing-angle technology is the important development direction for the LCD. However, when a viewing angle at a side direction or an oblique direction is too large, the wide-viewing-angle LCD often generates a color shift phenomenon.

The liquid crystal panel is an important component of the LCD. The liquid crystal panel comprises multiple pixel units, and each of the pixel units comprises: a pixel electrode, a common electrode TFTcom disposed on a thin-film-transistor (TFT) substrate, and a common electrode CFcom disposed on a color filter (CF) substrate. Wherein, the pixel electrode and the common electrode TFTcom form a storage capacitor Cst of the pixel unit, and the pixel electrode and the common electrode CFcom form a liquid crystal capacitor Clc of the pixel unit. In the prior art, to solve the color shift problem, each pixel unit is divided into two pixel regions, and one of the pixel regions add a compensation capacitor such that the two pixel regions have different liquid crystal capacitors Clc. As a result, the relationship of transmittance versus applied voltage is different at different pixel regions. Therefore, the liquid crystal panel can achieve a low color shift effect.

FIG. 1 is an equivalent circuit diagram of a pixel unit of a liquid crystal panel according to the prior art. As shown in FIG. 1, in the liquid crystal panel, multiple pixel units 10 are located among multiple data lines (Data) and multiple scan lines (Gate) disposed vertically with each other. FIG. 1 only exemplarily shows one pixel unit. Each of the pixel units is divided into two pixel regions 10a and 10b. In the pixel region 10a, a thin film transistor T1 connects to one of the data lines (Data) and one of the scan lines (Gate). In the pixel region 10a, a pixel electrode and a common electrode on the color filter substrate form a liquid crystal capacitor Clc1. In the pixel region 10a, the pixel electrode and a common electrode TFTcom on a TFT substrate form a storage capacitor Cst1. In the pixel region 10b, a thin film transistor T2 connects to one of the data lines (Data) and one of the scan lines (Gate). In the pixel region 10b, a pixel electrode and a common electrode on the color filter substrate form a liquid crystal capacitor Clc2. In the pixel region 10b, the pixel electrode and a common electrode TFTcom on the TFT substrate form a storage capacitor Cst2. A compensation capacitor Cdown is further disposed in the pixel region 10b. One terminal of the compensation capacitor Cdown connects to the common electrode TFTcom on the TFT substrate. The other terminal of the compensation capacitor Cdown connects to a sharing gate line (Gate0) through a sharing TFT T3. Because the compensation capacitor Cdown, when the liquid crystal panel is working, the pixel regions 10a and 10b exist different relationships of transmittance versus applied voltage so as to solve the color shift problem.

However, in the above illustrated liquid crystal panel, because each pixel unit is provided with a compensation capacitor Cdown, a sharing TFT T3, and a sharing gate line Gate0. Therefore, the fabrication difficulty of the liquid crystal panel is increased so as to increase the product cost. Besides, the aperture ratio of the liquid crystal panel is greatly decreased so as to affect the display quality of the liquid crystal panel.

SUMMARY OF THE INVENTION

To solve the existing problem of the prior art, the present invention provides a liquid crystal panel. The liquid crystal panel utilizes a layout structure of the common electrode located on the color filter substrate. The first pixel region and the second pixel region in the pixel unit have different liquid crystal capacitors such that relationship of transmittance versus applied voltage generated at the first pixel region and the second pixel region is different so as to solve the color shift problem of the liquid crystal panel. Besides, the layout structure of the common electrode is easily to achieve and simple in fabrication. Comparing to the prior art, the liquid crystal panel has a bigger aperture ratio and increases the display quality of the liquid crystal panel.

To achieve the above object, the present invention adopts the following technical solutions: a liquid crystal panel including multiple pixel units, each pixel unit including a first pixel region and a second pixel region, and the liquid crystal panel comprises: a thin-film-transistor (TFT) substrate; a color filter substrate disposed oppositely to the TFT substrate; a liquid crystal layer disposed between the TFT substrate and the color filter substrate; multiple pixel electrodes disposed on the TFT substrate; a common electrode disposed on the color filter substrate; a first insulation layer disposed on the color filter substrate, located in the first pixel region, and located between the color filter substrate and the common electrode; and a second insulation layer disposed on the color filter substrate, located in the second pixel region, and located above the color filter substrate and the common electrode; wherein, a distance between the pixel electrode in the second pixel region and the common electrode is greater than a distance between the pixel electrode in the first pixel region and the common electrode.

Wherein, a thickness of the first insulation layer and a thickness of second insulation layer are the same.

Wherein, the thickness of the first insulation layer and the thickness of second insulation layer range from 50 nm to 1000 nm.

Wherein, the first insulation layer and the second insulation layer are made of silicon nitride or silicon oxide.

Wherein, a thickness of second insulation layer is greater than a thickness of the first insulation layer.

Wherein, a thickness difference between the first insulation layer and the second insulation layer ranges from 50 nm to 500 nm.

Wherein, the first insulation layer and the second insulation layer are made of silicon nitride or silicon oxide.

Wherein, the common electrode is made of indium tin oxide (ITO).

Wherein, a passivation layer is disposed on the TFT substrate and the multiple pixel electrodes are disposed on the passivation layer.

Wherein, an isolation layer is further disposed between the multiple pixel electrodes and the liquid crystal layer.

Another aspect of the invention provides a liquid crystal display including a liquid crystal panel and a backlight module disposed oppositely to the liquid crystal panel, the backlight module providing a display light source to the liquid crystal panel such that the liquid crystal panel can display an image; the liquid crystal panel is illustrated as above.

Beneficial Effects:

The liquid crystal panel utilizes the layout structure of the common electrode located on the color filter substrate. The first pixel region and the second pixel region in the pixel unit have different liquid crystal capacitors such that relationship of transmittance versus applied voltage generated at the first pixel region and the second pixel region is different so as to solve the color shift problem of the liquid crystal panel. Besides, the layout structure of the common electrode is easily to achieve and simple in fabrication. Comparing to the prior art, the liquid crystal panel has a bigger aperture ratio and increases the display quality of the liquid crystal panel.

DETAILED DESCRIPTION OF THE PREFERRED EMBODIMENT

In order to better illustrate the technical characteristics and structure of the present invention, the following combines embodiments and figures for describing in detail.

Figure 2:
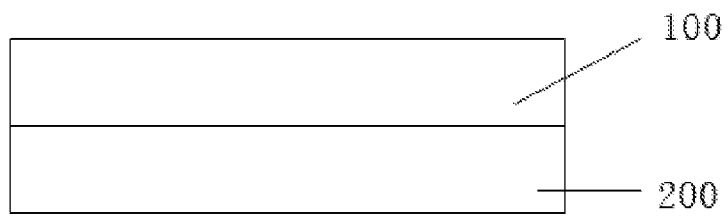
FIG. 2 is a schematic structure diagram of an LCD according to an embodiment of the present invention.

FIG. 2 is a schematic structure diagram of an LCD according to an embodiment of the present invention. As shown in FIG. 2, the liquid crystal display (LCD) comprises a liquid crystal panel 100 and a backlight module 200 disposed oppositely to the liquid crystal panel 100. The backlight module 200 provides a light source to the liquid crystal panel 100 so that the liquid crystal panel 100 can display an image.

Figure 1:
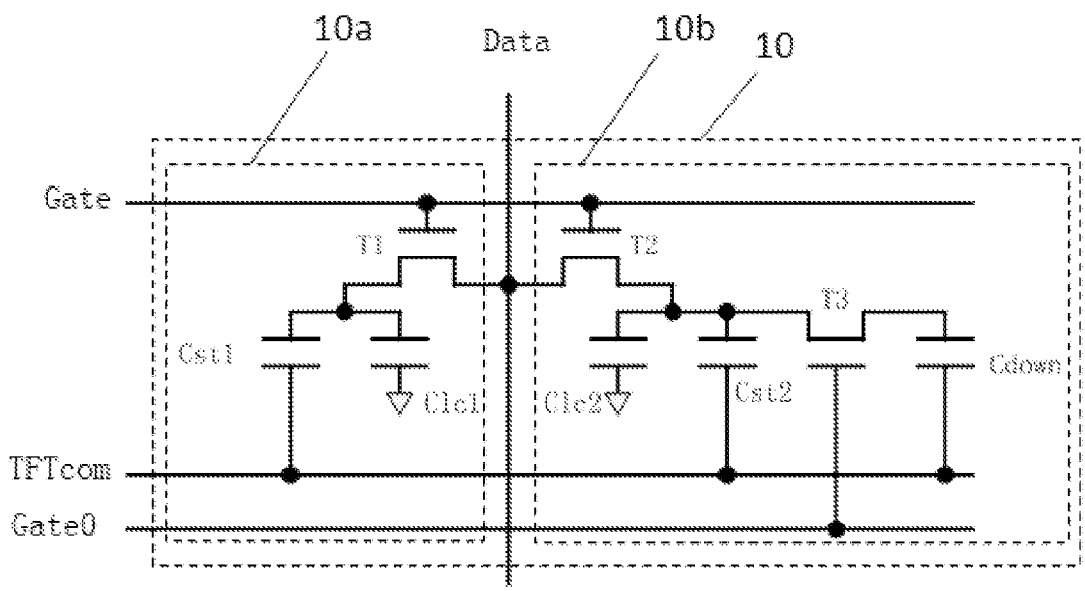
FIG. 1 is an equivalent circuit diagram of a pixel unit of a liquid crystal panel according to the prior art.
Figure 3:
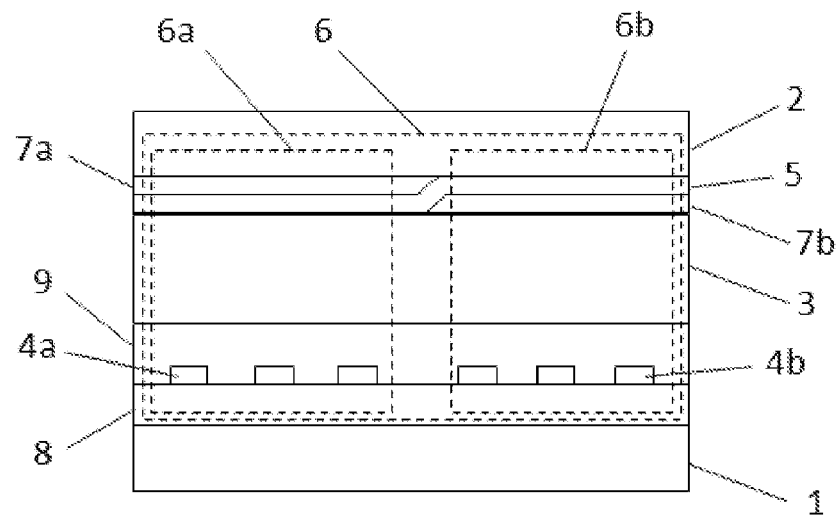
FIG. 3 is a schematic structure diagram of a liquid crystal panel according to an embodiment of the present invention.

As shown in FIG. 3, the liquid crystal panel 100 includes a thin film transistor (TFT) substrate 1, a color filter substrate 2 disposed oppositely to the TFT substrate 1, and a liquid crystal layer 3 disposed between the TFT substrate 1 and the color filter substrate 2. Multiple pixel electrodes 4a, 4b are disposed on the TFT substrate 1. A common electrode 5 is disposed on the color filter substrate 2. Liquid crystal capacitors are formed between the pixel electrodes 4a, 4b, and the common electrode 5. The applied voltage difference on the pixel electrodes 4a, 4b, and the common electrode 5 can deflect the liquid crystals in the liquid crystal layer 3 such that lights can pass through the liquid crystal layer 3. The liquid crystal layer 3 will has different light transmittance by applying different voltage difference between the pixel electrodes 4a, 4b, and the common electrode 5. A passivation layer 8 is disposed on the TFT substrate 1. The multiple pixel electrodes 4a, 4b are disposed on the passivation layer 8. An isolation layer 9 is disposed between the pixel electrodes 4a, 4b, and the liquid crystal layer 3. The liquid crystal panel 100 includes multiple pixel units 6, and FIG. 1 only exemplarily shows one pixel unit 6. Each pixel unit 6 comprises a first pixel region 6a and a second pixel region 6b. A first insulation layer 7a and a second insulation layer 7b are disposed on the color filter substrate 2.

Figure 4:
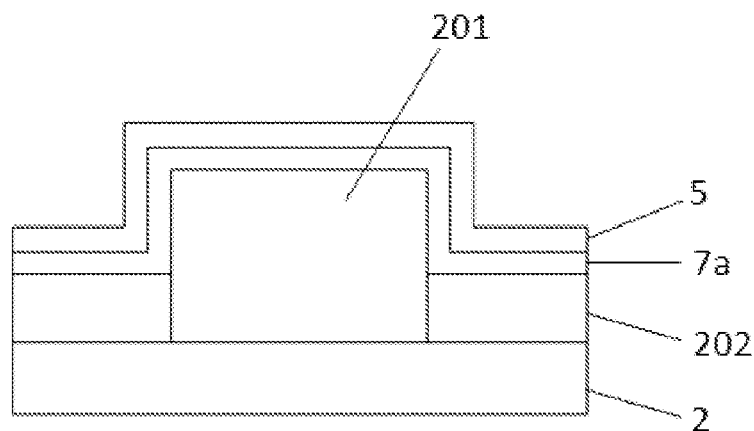
FIG. 4 is schematic layout diagram of a common electrode on a color filter substrate in a first pixel region according to an embodiment of the present invention.
Figure 5:
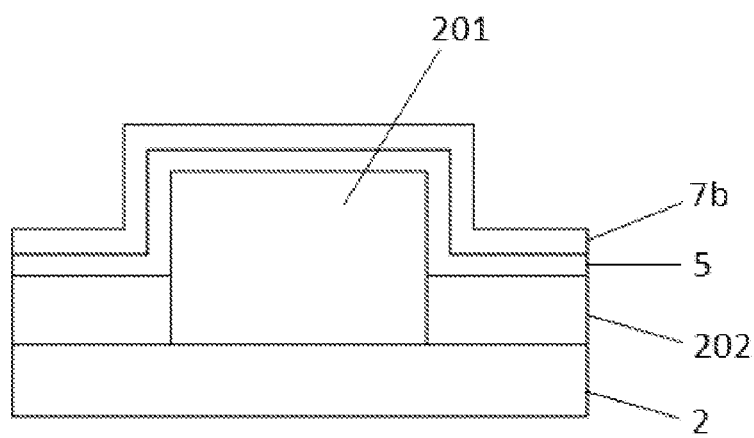
FIG. 5 is schematic layout diagram of a common electrode on a color filter substrate in a second pixel region according to an embodiment of the present invention.

Specifically, referring to FIG. 4 and FIG. 5, wherein, FIG. 4 is schematic layout diagram of the common electrode 5 on the color filter substrate 2 in the first pixel region 6a, and FIG. 5 is schematic layout diagram of the common electrode 5 on the color filter substrate 2 in the second pixel region 6b. The color filter substrate 2 includes a RGB sub-pixel structure 201 and a black matrix 202. As shown in FIG. 4, in the first pixel region 6a, the first insulation layer 7a is located between the color filter substrate 2 and the common electrode 5. As shown in FIG. 5, in the second pixel region 6b, the second insulation layer 7b is located above the color filter substrate 2 and the common electrode 5 such that a distance between the pixel electrode 4b in the second pixel region 6b and the common electrode 5 is greater than a distance between the pixel electrode 4a in the first pixel region 6a and the common electrode 5.

It should be noted that FIG. 4 and FIG. 5 are rotating 180 degrees relative to FIG. 3 for a better illustration. Therefore, for FIG. 3, the second insulation layer 7b is located below the color filter substrate 2 and the common electrode 5.

In the above embodiment, because the pixel electrodes 4a, 4b located on the TFT substrate 1 basically locate in the same horizontal level. Through disposing the common electrode 5, and the insulation layers 7a and 7b by different layout sequence in the first pixel region 6a and the second pixel region 6b such that the distance between the pixel electrode 4b in the second pixel region 6b and the common electrode 5 is greater than the distance between the pixel electrode 4a in the first pixel region 6a and the common electrode 5. As a result, in the pixel unit 6, the first pixel region 6a and the second pixel region 6b have different liquid crystal capacitors to generate different relationships of transmittance versus applied voltage so as to solve the color shift problem.

In the present embodiment, in order to simplify the fabrication process, the first insulation layer 7a and the second insulation layer 7b have the same thicknesses. The thicknesses are all 100 nm. Of course, in another embodiment, the thickness of the second insulation layer 7b may be greater than the first insulation layer 7a. A preferred thickness range of the first insulation layer 7a or the second insulation layer 7b is between 50 nm to 1000 nm. Besides, a thickness difference between the first insulation layer 7a and the second insulation layer 7b ranges from 50 nm to 500 nm.

Wherein, the first insulation layer 7a and the second insulation layer 7b are made of silicon nitride or silicon oxide.

In the present embodiment, the common electrode 5 is made of indium tin oxide (ITO).

The liquid crystal panel provided in the above embodiment utilizes the layout structure of the common electrode located on the color filter substrate. The first pixel region and the second pixel region in the pixel unit have different liquid crystal capacitors such that relationship of transmittance versus applied voltage generated at the first pixel region and the second pixel region is different so as to solve the color shift problem of the liquid crystal panel. Besides, the layout structure of the common electrode is easily to achieve and simple in fabrication. Comparing to the prior art, the liquid crystal panel has a bigger aperture ratio and increases the display quality of the liquid crystal panel.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus. For a structure which is described to be located above or below another element means that the structure is directly or indirectly at the upper side or lower side of the element.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal panel including multiple pixel units, each pixel unit including a first pixel region and a second pixel region, and the liquid crystal panel comprises:
   a thin-film-transistor (TFT) substrate;
   a color filter substrate disposed oppositely to the TFT substrate;
   a liquid crystal layer disposed between the TFT substrate and the color filter substrate;
   multiple pixel electrodes disposed on the TFT substrate, wherein the multiple pixel electrodes includes a first pixel electrode located in the first pixel region and a second pixel electrode located in the second pixel region;
   a RGB sub-pixel structure disposed on the color filter substrate;
   a black matrix disposed on the color filter substrate;
   a common electrode disposed above the color filter substrate, and disposed above the RGB sub-pixel and the black matrix;
   a first insulation layer located in the first pixel region, and disposed only right opposite to the first pixel electrode, located between the color filter substrate and the common electrode, and the first insulation layer is disposed above and covering the RGB sub-pixel and the black matrix; and
   a second insulation layer located in the second pixel region and disposed only right opposite to the second pixel electrode, located above the color filter substrate and the common electrode, and the second insulation layer is disposed above and covering the RGB sub-pixel and the black matrix;
   wherein, a distance between the second pixel electrode in the second pixel region and the common electrode is greater than a distance between the first pixel electrode in the first pixel region and the common electrode such that a second liquid crystal capacitor formed between the second pixel electrode and the common electrode is different from a first liquid crystal capacitor formed between the first pixel electrode and the common electrode.

2. The liquid crystal panel according to claim 1, wherein, a thickness of the first insulation layer and a thickness of second insulation layer are the same.

3. The liquid crystal panel according to claim 2, wherein, the thickness of the first insulation layer and the thickness of second insulation layer range from 50 nm to 1000 nm.

4. The liquid crystal panel according to claim 3, wherein, the first insulation layer and the second insulation layer are made of silicon nitride or silicon oxide.

5. The liquid crystal panel according to claim 1, wherein, a thickness of second insulation layer is greater than a thickness of the first insulation layer.

6. The liquid crystal panel according to claim 5, wherein, a thickness difference between the first insulation layer and the second insulation layer ranges from 50 nm to 500 nm.

7. The liquid crystal panel according to claim 6, wherein, the first insulation layer and the second insulation layer are made of silicon nitride or silicon oxide.

8. The liquid crystal panel according to claim 1, wherein, the common electrode is made of indium tin oxide (ITO).

9. The liquid crystal panel according to claim 1, wherein, a passivation layer is disposed on the TFT substrate and the multiple pixel electrodes are disposed on the passivation layer.

10. The liquid crystal panel according to claim 1, wherein, an isolation layer is further disposed between the multiple pixel electrodes and the liquid crystal layer.

11. A liquid crystal display including a liquid crystal panel and a backlight module disposed oppositely to the liquid crystal panel, the backlight module providing a display light source to the liquid crystal panel such that the liquid crystal panel can display an image; the liquid crystal panel including multiple pixel units, each pixel unit including a first pixel region and a second pixel region, and the liquid crystal panel comprises:
   a thin-film-transistor (TFT) substrate;
   a color filter substrate disposed oppositely to the TFT substrate;
   a liquid crystal layer disposed between the TFT substrate and the color filter substrate;
   multiple pixel electrodes disposed on the TFT substrate, wherein the multiple pixel electrodes includes a first pixel electrode located in the first pixel region and a second pixel electrode located in the second pixel region;
   a RGB sub-pixel structure disposed on the color filter substrate;
   a black matrix disposed on the color filter substrate;
   a common electrode disposed above the color filter substrate, and disposed above the RGB sub-pixel and the black matrix;
   a first insulation layer located in the first pixel region, and disposed only right opposite to the first pixel electrode, located between the color filter substrate and the common electrode, and the first insulation layer is disposed above and covering the RGB sub-pixel and the black matrix; and
   a second insulation layer located in the second pixel region and disposed only right opposite to the second pixel electrode, located above the color filter substrate and the common electrode, and the second insulation layer is disposed above and covering the RGB sub-pixel and the black matrix;

wherein, a distance between the second pixel electrode in the second pixel region and the common electrode is greater than a distance between the first pixel electrode in the first pixel region and the common electrode such that a second liquid crystal capacitor formed between the second pixel electrode and the common electrode is different from a first liquid crystal capacitor formed between the first pixel electrode and the common electrode.

12. The liquid crystal display according to claim 11, wherein, a thickness of the first insulation layer and a thickness of second insulation layer are the same.

13. The liquid crystal display according to claim 12, wherein, the thickness of the first insulation layer and the thickness of second insulation layer range from 50 nm to 1000 nm.

14. The liquid crystal display according to claim 13, wherein, the first insulation layer and the second insulation layer are made of silicon nitride or silicon oxide.

15. The liquid crystal display according to claim 11, wherein, a thickness of second insulation layer is greater than a thickness of the first insulation layer.

16. The liquid crystal display according to claim 15, wherein, a thickness difference between the first insulation layer and the second insulation layer ranges from 50 nm to 500 nm.

17. The liquid crystal display according to claim 16, wherein, the first insulation layer and the second insulation layer are made of silicon nitride or silicon oxide.

18. The liquid crystal display according to claim 11, wherein, the common electrode is made of indium tin oxide (ITO).

19. The liquid crystal display according to claim 11, wherein, a passivation layer is disposed on the TFT substrate and the multiple pixel electrodes are disposed on the passivation layer.

20. The liquid crystal display according to claim 11, wherein, an isolation layer is further disposed between the multiple pixel electrodes and the liquid crystal layer.

\* \* \* \* \*